(12) United States Patent
Manzo

(10) Patent No.: US 9,341,396 B2
(45) Date of Patent: May 17, 2016

(54) RETRO-FIT ENERGY EXCHANGE SYSTEM FOR TRANSPARENT INCORPORATION INTO A PLURALITY OF EXISTING ENERGY TRANSFER SYSTEMS

(75) Inventor: Aniello Manzo, Burnaby (CA)

(73) Assignee: ENERGY RECOVERY SYSTEMS INC., Vancouver, BC (CA)

( * ) Notice: Subject to any disclaimer, the term of this patent is extended or adjusted under 35 U.S.C. 154(b) by 784 days.

(21) Appl. No.: 13/641,540

(22) PCT Filed: Apr. 16, 2010

(86) PCT No.: PCT/CA2010/000605
§ 371 (c)(1),
(2), (4) Date: Oct. 16, 2012

(87) PCT Pub. No.: WO2011/127553
PCT Pub. Date: Oct. 20, 2011

(65) Prior Publication Data
US 2013/0031933 A1    Feb. 7, 2013

(51) Int. Cl.
F25B 29/00       (2006.01)
F24D 19/10       (2006.01)
F24F 11/00       (2006.01)
F25B 49/02       (2006.01)

(52) U.S. Cl.
CPC .......... *F25B 29/003* (2013.01); *F24D 19/1006* (2013.01); *F24F 11/0009* (2013.01); *F25B 29/00* (2013.01); *F25B 49/02* (2013.01); *Y10T 137/6416* (2015.04)

(58) Field of Classification Search
CPC .... F25B 29/003; F25B 29/00; F24D 17/0089; F24D 2200/16
See application file for complete search history.

(56) References Cited

U.S. PATENT DOCUMENTS

| | | | | |
|---|---|---|---|---|
| 1,969,187 | A | * | 8/1934 | Schutt .......................... 165/236 |
| 2,456,386 | A | * | 12/1948 | Cooper .......................... 62/175 |
| 3,922,876 | A | * | 12/1975 | Wetherington et al. ......... 62/180 |
| 4,098,092 | A | | 7/1978 | Singh |
| 4,141,222 | A | | 2/1979 | Ritchie |
| 4,142,379 | A | | 3/1979 | Kuklinski |
| 4,199,955 | A | | 4/1980 | Jonsson |
| 4,226,606 | A | * | 10/1980 | Yaeger et al. ................ 62/238.6 |
| 4,238,931 | A | | 12/1980 | Campbell |
| 4,241,588 | A | | 12/1980 | Murphy et al. |

(Continued)

FOREIGN PATENT DOCUMENTS

| | | |
|---|---|---|
| CA | 2229355 C | 2/1999 |
| CA | 2574996 A1 | 12/2006 |

(Continued)

OTHER PUBLICATIONS

International Search Report and Written Opinion of the International Searching Authority in corresponding International Application PCT/CA2010/000605, mailed Apr. 16, 2010.

*Primary Examiner* — Ljiljana Ciric
*Assistant Examiner* — Alexis Cox
(74) *Attorney, Agent, or Firm* — Perry + Currier, INC

(57) ABSTRACT

A retrofit energy exchange system including a first set of valves for connecting to a first energy transfer sub-system. The system further includes a second set of valves for connecting to a second energy transfer sub-system. In addition, the system includes an energy exchange unit configured to supply excess energy from to the first energy transfer sub-system to the second energy transfer sub-system.

11 Claims, 7 Drawing Sheets

(56) References Cited

U.S. PATENT DOCUMENTS

| | | |
|---|---|---|
| 4,281,519 A | 8/1981 | Spath et al. |
| 4,293,323 A | 10/1981 | Cohen |
| 4,386,500 A | 6/1983 | Sigafoose |
| 4,492,092 A | 1/1985 | Smorol et al. |
| 4,680,941 A | 7/1987 | Richardson et al. |
| 4,685,307 A | 8/1987 | Jones |
| 4,732,007 A | 3/1988 | Dolan et al. |
| 4,773,231 A | 9/1988 | Sulzberger |
| 5,020,721 A | 6/1991 | Horne |
| 5,050,394 A * | 9/1991 | Dudley et al. ............. 62/115 |
| 5,220,807 A | 6/1993 | Bourne et al. |
| 5,351,502 A | 10/1994 | Gilles et al. |
| 5,575,159 A | 11/1996 | Dittell |
| 5,695,004 A | 12/1997 | Beckwith |
| 5,758,820 A | 6/1998 | Celorier, Jr. et al. |
| 5,906,104 A | 5/1999 | Schwartz et al. |
| 5,984,198 A | 11/1999 | Bennett et al. |
| 8,037,931 B2 | 10/2011 | Penev et al. |
| 2001/0003347 A1 * | 6/2001 | Shimoda et al. ............. 236/13 |
| 2002/0020175 A1 * | 2/2002 | Street et al. ............. 62/132 |
| 2005/0039878 A1 * | 2/2005 | Meyer et al. ............. 165/42 |
| 2005/0066678 A1 * | 3/2005 | Kamimura ............. 62/238.7 |
| 2007/0000262 A1 | 1/2007 | Ikegami et al. |
| 2010/0064710 A1 * | 3/2010 | Slaughter ............. 62/238.7 |
| 2010/0193152 A1 | 8/2010 | Singleton, Jr. et al. |
| 2014/0026608 A1 * | 1/2014 | Manzo et al. ............. 62/305 |

FOREIGN PATENT DOCUMENTS

| | | |
|---|---|---|
| CN | 101240949 B | 8/2008 |
| GB | 2052712 | 1/1981 |
| WO | 2004051148 A1 | 6/2004 |

* cited by examiner

US 9,341,396 B2

RETRO-FIT ENERGY EXCHANGE SYSTEM FOR TRANSPARENT INCORPORATION INTO A PLURALITY OF EXISTING ENERGY TRANSFER SYSTEMS

CROSS REFERENCE TO RELATED APPLICATIONS

This application is a 35 U.S.C. §371 national stage application claiming priority benefits of International Patent Application No. PCT/CA2010/000605, filed Apr. 16, 2010, which is hereby incorporated herein by reference.

FIELD

The present invention relates generally to energy exchange and distribution systems including heating, ventilation, air-conditioning and water heating, and more particularly relates to a retrofit energy exchange system for transparent incorporation into a plurality of existing energy transfer systems.

BACKGROUND

It is known to employ energy exchange technologies in order to, for example, recover excess heat from an air-conditioning system to provide energy to heat water. The prior art has many examples of such heat-exchange technologies. A cluster of prior art references are also found from the early 1980s which reflect the end of the energy crises of the 1970s. It is interesting to note that these heat-exchange technologies have not been generally adopted, despite their apparent advantages.

SUMMARY

An aspect of this specification provides:

a first set of valves for connection to a first connection point of a first energy transfer sub-system; said first energy transfer sub-system having a potential excess supply of energy available at said first connection point; said first energy transfer system connected a first controller; said first controller configured to receive at least one first input for providing data to said first controller; said first controller configured to send at least one output to said first energy transfer sub-system for selectively instructing activation or deactivation of said first energy transfer sub-system to thereby generate said potential excess supply of energy; said first controller having a passive connection point configured to output a first set data received from said first input;

a second set of valves for connection to a second connection point of a second energy transfer sub-system; said second energy transfer sub-system having a potential demand for energy at said second connection point; said second energy transfer system connected a second controller; said second controller configured to receive at least one second input for providing data to said second controller; said second controller configured to send at least one output to said second energy transfer sub-system for selectively instructing activation or deactivation of said second energy transfer sub-system to thereby realize said potential demand for energy; said second controller having a passive connection point to output a second set of data received from said second input;

an energy exchange unit connectable to said first set of valves via a first conduit; said energy transfer unit connectable to said second set of valves via a second conduit; an energy exchange unit controller connectable to said first energy transfer sub-system and said second energy transfer sub-system to receive said first inputs and said at least one second input; said energy exchange unit controller configured to activate said energy exchange unit when said energy exchange unit controller determines, based on said first input and said second input, that a present excess supply of energy from said first energy transfer system is available to satisfy a present demand for energy at said second energy transfer sub-system.

DETAILED DESCRIPTION OF THE EMBODIMENTS

Figure 1:
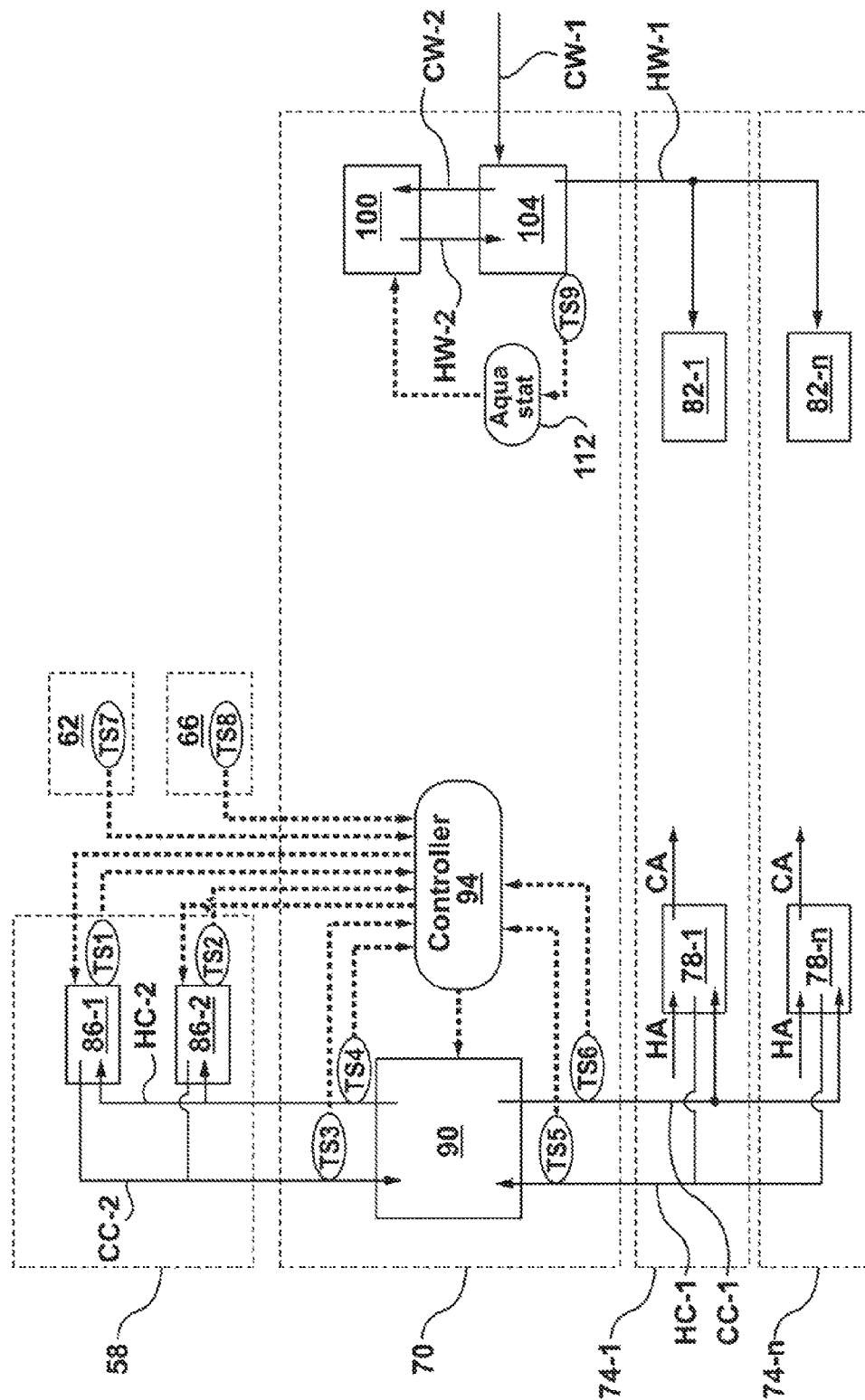
FIG. 1 shows a prior art complete air-conditioning system and separate hot water system for a multi-unit structure.

The teachings herein have application to a wide variety of existing energy transfer systems. An example of an energy system is shown in FIG. 1 and indicated generally at 50. Energy system 50 is incorporated into a multi-unit structure, such as an apartment building or office tower. Thus, a plurality of suites 54-1 ... 54-n are found through-out the structure. Generically, each suite is referred to as suite 54, while collectively, all suites are referred to as suites 54-n. This nomenclature is used elsewhere herein.) A cooling tower 58 is also provided on the roof of the structure. The structure also comprises at least one indoor common area 62, such as a hallway or foyer. In FIG. 1, the structure is also defined in terms of its context in relation to at least one outdoor area 66 that is outside the structure. A mechanical room 70 is also provided in the basement of the structure.

Each suite 74 comprises a heat transfer coil 78, which is shown in FIG. 1 as operating in an air-conditioning mode whereby energy within hot air HA passing over coil 58 is absorbed by a cold coolant CC-1 that passes through coil 78, such that cold air CA exits coil 58 and into suite 54 and hot coolant HC-1 exits coil 78, the energy from the hot air HA having been absorbed the cold coolant CC-1. Each suite 74 also comprises a hot water demand 82. Hot water demand 82 can be any one of a sink, shower, or bathtub or other fixture which can receive hot water HW.

Cooling tower 58 comprises a plurality of heat transfer units 86, each of which can receive hot coolant CC-2 and transfer energy therefrom into the ambient air on the rooftop and then return cold coolant CC-2. Each transfer unit 86 also comprises at least one temperature sensor TS that sends an electronic output therefrom representing a temperature reading of the ambient air on the rooftop or the temperature of hot coolant CC-2 or cold coolant CC-2 or all of them.

Indoor common area 62 comprises at least one temperature sensor TS-7 that sends an electrical output representing a temperature reading of the ambient air of that common area. Note that indoor common area 62 can, in variations, comprise a heat transfer coil 78.

Outdoor area 66 comprises at least one temperature sensor TS-8 that sends an electrical output representing a temperature reading of the ambient air respective to the location of that temperature sensor TS-8. Note that where a plurality of temperature sensors TS-8 are provided, each of those sensors may be located on different sides and heights of the structure, such that the actual temperature reading from each can vary substantially according to time of day and when a particular temperature sensor is exposed to sun, shade, wind or other environmental variables.

Mechanical room 70 comprises a central energy exchange unit 90 that interconnects cooling tower 58 and transfer coils 78, where excess energy from hot coolant HC-1 is transferred to cold coolant CC-2 to thereby generate hot coolant HC-2 and cold coolant CC-1. A temperature sensor TS-3 connects to a cold coolant line to sense the temperature of cold coolant CC-2 as it enters central energy exchange unit 90. A temperature sensor TS-4 connects a hot coolant line to sense the temperature of hot coolant HC-2 as it leaves central energy exchange unit 90. A temperature sensor TS-5 connects to another hot coolant line to sense the temperature of hot coolant HC-1 as it enters central energy exchange unit 90. A temperature sensor TS-6 connects to another cold coolant line to sense the temperature of hot coolant CC-1 as it leaves central energy exchange unit 90.

A first controller 94 receives input from temperature sensors TS, and also connects to central energy exchange unit 90 and to heat transfer units 86 to selectively activate or deactivate central energy exchange unit 90 or heat transfer units 86 or all of them according to temperatures from temperature sensors TS. More specifically, first controller 94 infers demand for cooling from suites 74 via temperature sensor TS-5 and temperature sensor TS-6, while at the same time infers cooling capacity of cooling tower 58 using a remainder of the temperature sensors TS. From such inferences, first controller 94 can selectively activate pumps, compressors and fans associated with central energy exchange unit 90 and heat transfer units 86 to satisfy demand from suites 74. Controller 94 also typically includes an output port based on a standard format (e.g. RJ45/Ethernet, or Universal Serial Bus, or RS-232, or the like) for monitoring controller 94.

The foregoing description of the structure and operation of transfer coils 78, central energy exchange unit 90 and heat transfer units 86 are intended to capture a generic cooling system that can be employed to provide a cooling system for suites 74. It is to be understood, however, that the actual implementations vary according a number of variables, including the size of suites 74, the size and manufacturer of transfer coils 78, central energy exchange unit 90, heat transfer units 86, and first controller 94 and the climate in which the structure is located. Those skilled in the art will appreciate that first controller 94 is uniquely programmed according to the unique installation for a given structure and combination of transfer coils 78, heat transfer units 86, temperature sensors TS and central energy exchange units 94. Therefore, notwithstanding the generic description provided, the specific implementation for a given structure will be expected to be different, and possibly substantially different, for each and every structure. Table I shows examples of specific manufacturers and model descriptions that can be employed to implement such a cooling system for suites 74.

TABLE I

Example components for Cooling System

| Common Product Name | Manufacturer | Model | Suitable For |
|---|---|---|---|
| Heat pump | Carrier | 25HNA9 | Transfer coil 78 |
| Roof top chiller | Carrier | 50VL | Heat Transfer units 90 |
| Programmable Logic Controller | Honeywell | 2MLR-CPUH/F | First controller 94 |

Mechanical room 70 also comprises a domestic water heating unit 100 and water tank 104 and that is configured to receive domestic cold water from a municipal water supply 108. At least one temperature sensor TS-9 that is associated with tank 104 and is able to determine water temperature(s) associated with tank 104. Temperature sensor TS-9 is connected to a second controller 112 which in turn connects to heating unit 100. Second controller 112 is configured to activate or deactivate a heating element (e.g. a gas flame) within heating unit 100 based on temperature sensed at temperature sensor TS-9. Temperature sensor TS-9 thus comprises an output line that sends a temperature signal to second controller 112. Domestic cold water CW-1 from supply 108 enters tank and can flow into heating unit 100 where it undergoes an increase in temperature and then domestic hot water HW-1 flows back into tank 104. As water demand(s) 82 are activated, hot water HW is drawn from tank 104 to the activated demand (82).

Again, the foregoing description of the structure and operation of heating unit 100 and water tank 104 and controller 112 are intended to capture a generic water heating system that can be employed to provide hot water to suites 74. It is to be understood, however, that the actual implementations vary according a number of variables, including the size of suites 74, the size and manufacturer of heating unit 100, water tank 104, second controller 112, the temperature of water received from domestic water supply 108, and the climate in which the structure is located. Those skilled in the art will appreciate that second controller 112 is uniquely configured according to the unique installation for a given structure and combination of heating unit 100, water tank 104. Therefore, notwithstanding the generic description provided, the specific implementation for a given structure will be expected to be different, and possibly substantially different, for each and every structure. Table II shows examples of specific manufacturers and model descriptions that can be employed to implement such a water heating system for suites 74.

TABLE II

Example components for Water Heating System

| Common Product Name | Manufacturer | Model | Suitable For |
|---|---|---|---|
| Water Tank | RHeeM | GHE100-130 (A) | Water tank 104 |
| Aquastat | Honeywell | L4006 | Second controller 112 |
| Programmable Logic Controller | Honeywell | 2MLR-CPUF | Second controller 112 |
| Heating Unit | Burnham | P203 | Water heater 100 |

Figure 2:
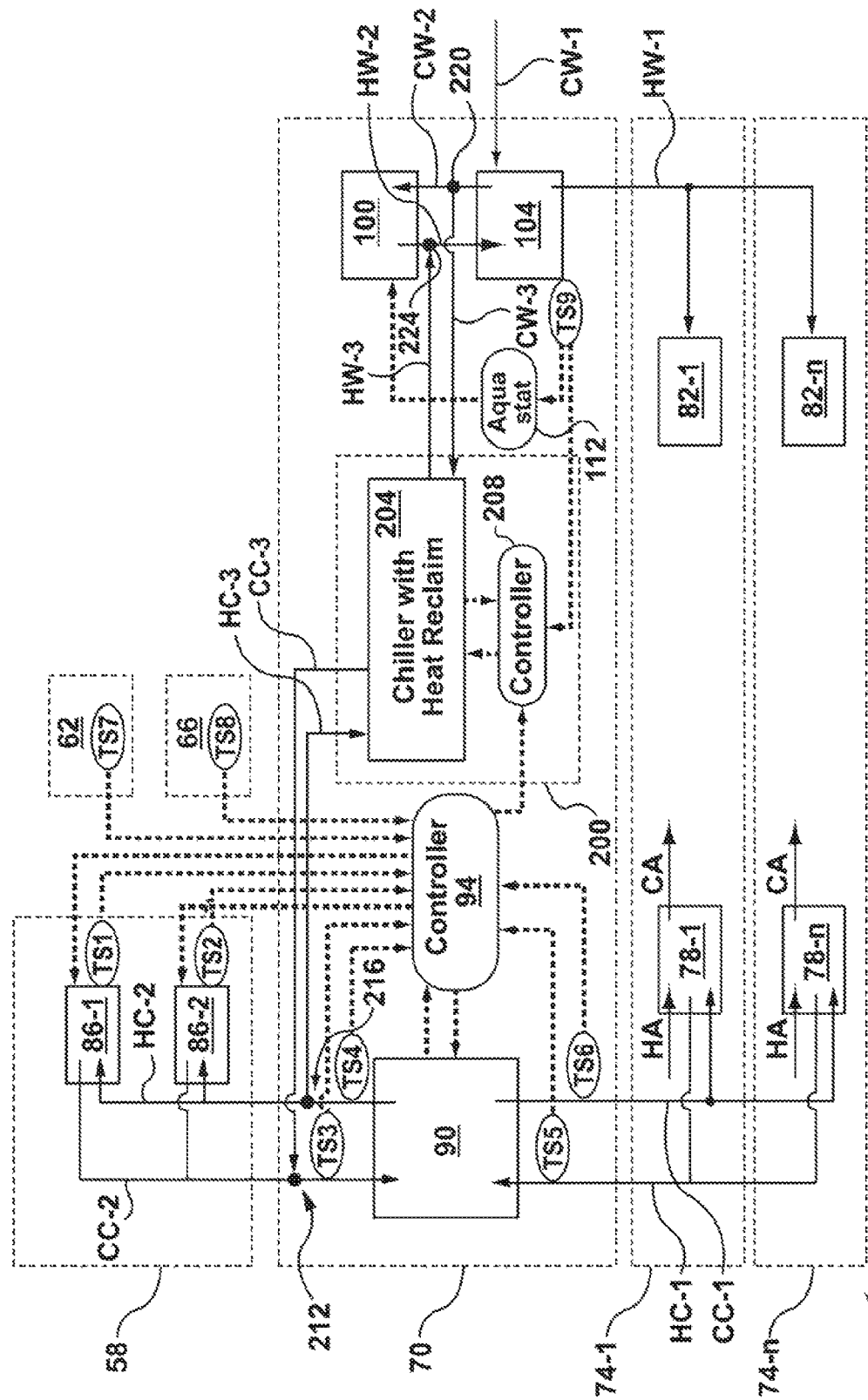
FIG. 2 shows a retrofit system incorporated into a complete air-conditioning system and separate hot water system for a multi-unit structure.

Referring now to FIG. 2, a retrofit energy exchange system is indicated at 200, which becomes part of an energy system 50a. Like components in system 50a bear like references to their counterparts in system 50. System 200 comprises an energy exchange unit 204, an energy exchange controller 208, a first valve 212 for tapping into the cold coolant line carrying cold coolant CC-2, a coolant return line (for carrying cold coolant CC-3) to connect energy exchange unit 204 to first valve 212, a second valve 216 for tapping into the hot coolant line carrying hot coolant HC-3, a coolant supply line (for carrying hot coolant HC-3) that connects energy exchange unit 204 to second valve 216, a third valve 220 for tapping into the cold water line carrying for cold water CW-2, a cold water line (for carrying cold water CW-3) connecting energy exchange unit 204 with third valve 220, a fourth valve 224 for tapping into the hot water line carrying hot water HW-2, and a hot water line (for carrying hot water HW-3) connecting fourth valve 224 to energy exchange unit 204.

As will be discussed in greater detail below, system 200 is "turn-key" and is configured to connect to any combination of different individual components that can be used to implement the components shown in FIG. 1, including, for example, any implementation of various combinations of components from Table I and Table II, without requiring material modification to any of those components.

An example energy exchange unit 204 will now be discussed with reference to FIG. 3. Energy exchange unit 204 generally incorporates the components of a conventional vapour-compression refrigeration cycle, namely a compressor 320, a condenser 322, and an evaporator 324. In addition, energy exchange unit 204 comprises a heat reclamation unit 326. Heat reclamation unit 326 is placed in thermal communication with cold water CW-3 to produce hot water HW-3. Evaporator 324 is placed in thermal communication with hot coolant HC-3 to produce cold coolant CC-3. Condenser 322 can be operated in either an air-cooled format, or a liquid-cooled format. (Where liquid cooled, cold water CW-3 can also be directed to flow over condenser 322, although this is not shown in FIG. 3.) In the air-cooled format, the condenser 22 is placed in thermal communication with ambient air. Each of the above-noted components are provided with suitable tubing and fittings, to permit the cyclical flow of a refrigerant through these components.

Compressor 320 is responsible for moving the refrigerant through the system, and for compressing the refrigerant into a hot, high-pressure refrigerant vapour. Exemplary compressors used in typical vapour-compression systems include reciprocating, rotary screw, centrifugal, scroll, variable-speed and two-speed compressors.

In a typical cycle, refrigerant R flows in the directional order of compressor 320, heat reclamation unit 326, condenser 322, evaporator 324, and back to compressor 320. The vapour-compression system generally described above may comprise additional components for proper and efficient operation. For example, energy exchange unit 204 also comprises a metering device 332 situated between condenser 322 and evaporator 324. Metering device 332 provides a throttling effect to drop the pressure and temperature of the refrigerant, while also controlling the flow of refrigerant into the evaporator 324. Exemplary metering devices include expansion valves (e.g. thermostatic expansion valves) and capillary tubes.

Energy exchange unit 204 can comprise other suitable components, such as accumulators (liquid-vapour separators), compressor (or crankcase) heaters, strainers, driers, and auxiliary heating elements, as generally known in the art. Energy exchange unit 204 can also comprise a range of industry-standard fittings, as well as customized fittings to enable refrigerant maintenance and replacement, system flushing, refrigerant bypass operations, as well as a range of industry-standard operations as would be familiar to one skilled in the art.

In general, during a typical cycle of the water chiller system, refrigerant R is pressurized at the compressor 320, turning it into a high-pressure, high temperature vapour. High-pressure, high temperature vapour then enters the heat reclamation unit 326, transferring a portion of the heat to a second medium, for example the cold water CW-3. As such, cold water CW-3 is heated, and subsequently delivered to tank 104, effectively providing at least some hot water for tank 104 without using heating unit 100. Next, the high-pressure, high-temperature refrigerant R in the form of vapour enters condenser 322 wherein it transfers additional heat to a comparatively cooler medium, (either air or a liquid), causing condensation of refrigerant R into a high-pressure, high-temperature liquid. The high-pressure, high-temperature liquid then exits condenser 322, and is subject to throttling at metering device 332 prior to entry into the evaporator 324. Throttling the refrigerant drops the pressure and temperature of the refrigerant to below that of the water temperature of the second piped water source 330, turning the refrigerant into a low-pressure, low-temperature liquid. As such, heat transfer from hot coolant HC-3 to refrigerant R occurs evaporator 324, at which point the low-pressure, low temperature liquid is turned into a low-pressure, low-temperature vapour. As a result of the heat transfer in the evaporator 324, hot coolant HC-3 becomes cold coolant CC-3 and is returned to energy exchange unit 90, effectively providing at least some cold coolant CC-3 without relying on cooling tower 58. To complete the cycle, the refrigerant in the form of low-pressure, low-temperature vapour passes back to the compressor 320 for a subsequent cycle.

In general, the portion of the cycle between the compressor 320 and the metering device 332 on the side of the condenser 322 is considered the high pressure high temperature region of the cycle. In turn, the portion of the cycle on the side of the evaporator 324 is considered the low pressure low temperature region. As such, energy exchange unit 204 provides for heating at the heat reclamation unit 326 in the high pressure high temperature region, and further provides for cooling at the evaporator 324 in the low pressure low temperature region.

As mentioned above, an exemplary metering device 332 suitable for use in the water chiller system is an expansion valve. In one embodiment, expansion valve 332 is an adjustable expansion valve. Expansion valve 332, and metering devices in general, meter the flow of refrigerant from the high pressure side of the vapour compression cycle to the low pressure side. With an adjustable expansion valve, the metering of refrigerant across this threshold can be varied in accordance with the heat loads of the system. Under conditions of reduced load, such as where a decreased temperature differential across the evaporator 324 is required, less heat is transferred to the refrigerant, reducing the amount of energy available to convert the refrigerant to vapour. Without adjusting the expansion valve 332 to meet the required load, excessive amount is of refrigerant may pass into the evaporator 324, with possible liquid refrigerant passing through and onto the compressor 320. This condition is generally referred to as "flooding", and can damage the compressor 320. In circumstances where there is increased load, a greater amount of refrigerant R is used to handle the increased demand for heat transfer. Insufficient refrigerant R flow into the evaporator 324 can lead to "starvation" at the evaporator 324 and compressor 320. Both circumstances result in reduced overall efficiency, with possible damaging effects to the system.

Figure 3:
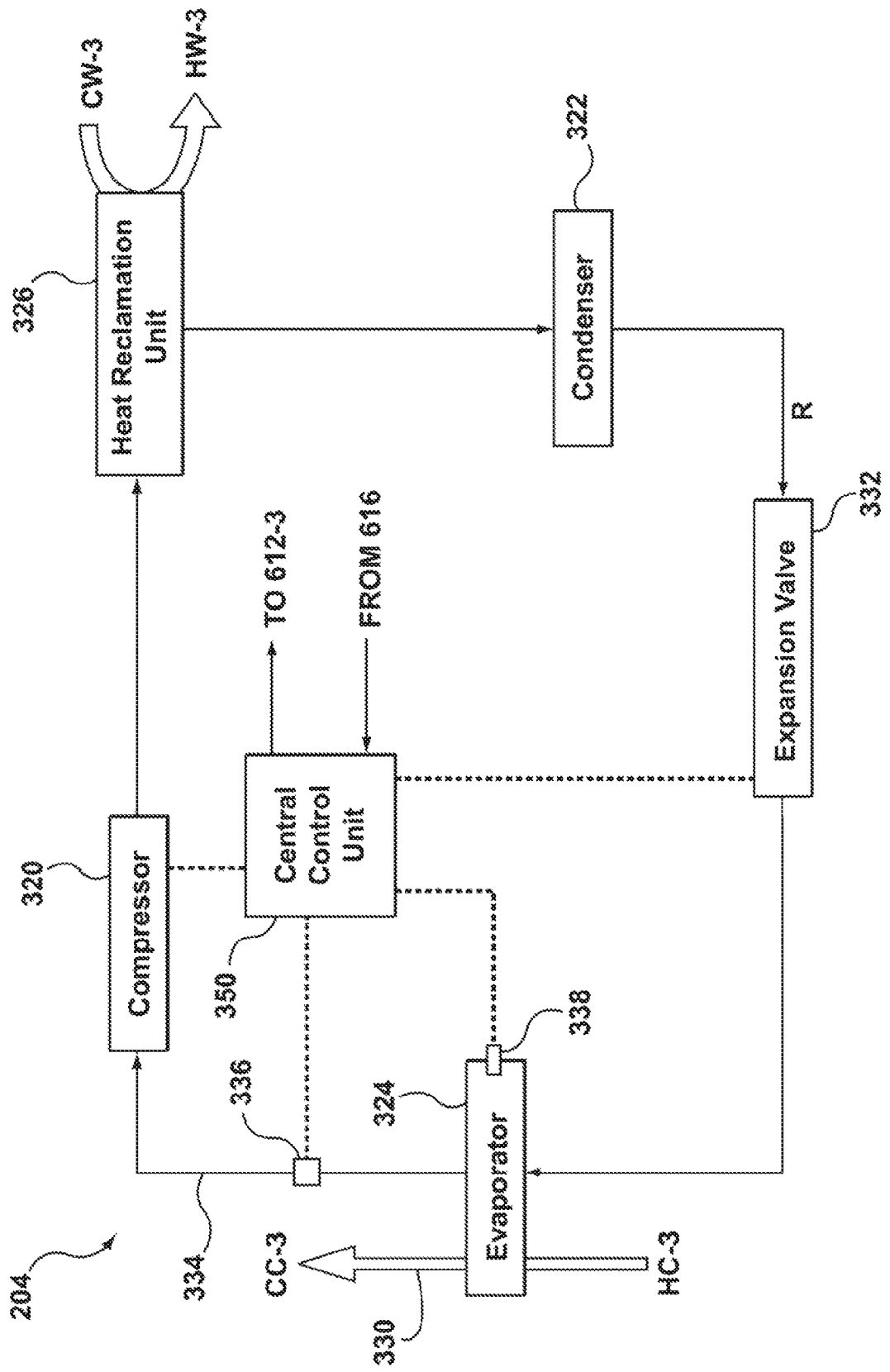
FIG. 3 shows a schematic representation of an exemplary energy exchange unit that can be used in the system of FIG. 2.

As shown in FIG. 3, a central control unit 350 (which can be implemented as part of energy exchange controller 208, or central control unit can be implemented as a stand-alone unit in communication with exchange controller 208) is used to monitor and control the adjustable expansion valve 332 during operation of energy exchange unit 204. Central control unit 350 is configured to signal system components, for example the adjustable expansion valve 332 and compressor 320, based on inputs received from one or more sensors placed on the energy exchange unit 204. The central control unit 350 comprises a microcomputer comprised of one or more central processing units connected to volatile memory (e.g. random access memory) and non-volatile memory (e.g. FLASH memory). Data input, analysis and functional control processes are received/executed in the one or more processing units comprising the control unit. The microcomputer includes a hardware configuration that can comprise one or more input devices in the form of a keyboard, a mouse and the like; as well as one more output devices in the form of a display, printer and the like.

To assess the heat load of energy exchange unit 204, refrigerant return tube 334 between is fitted with a temperature sensor 336. In some embodiments, central control unit 350 may also receive input from a fluid level sensor 338 within the evaporator 324. Based on inputs from the one or more sensors, the expansion valve 332 can be adjusted to meter a more suitable flow of refrigerant R from the high pressure side of the vapour-compression cycle, to the low pressure side. With the central control unit 350 monitoring the temperature of the exiting vapour from the evaporator 324, and the fluid level of the refrigerant contained therein, a balance between the extremes of "flooding" and "starvation" of the evaporator 324 and compressor 320 can be established, thereby improving the overall efficiency of the system. In one embodiment, incremental adjustments of the expansion valve 332 achieve a five ° C. differential, allowing energy exchange unit 204 to be efficiently tuned to match the heat load on the system.

Figure 4:
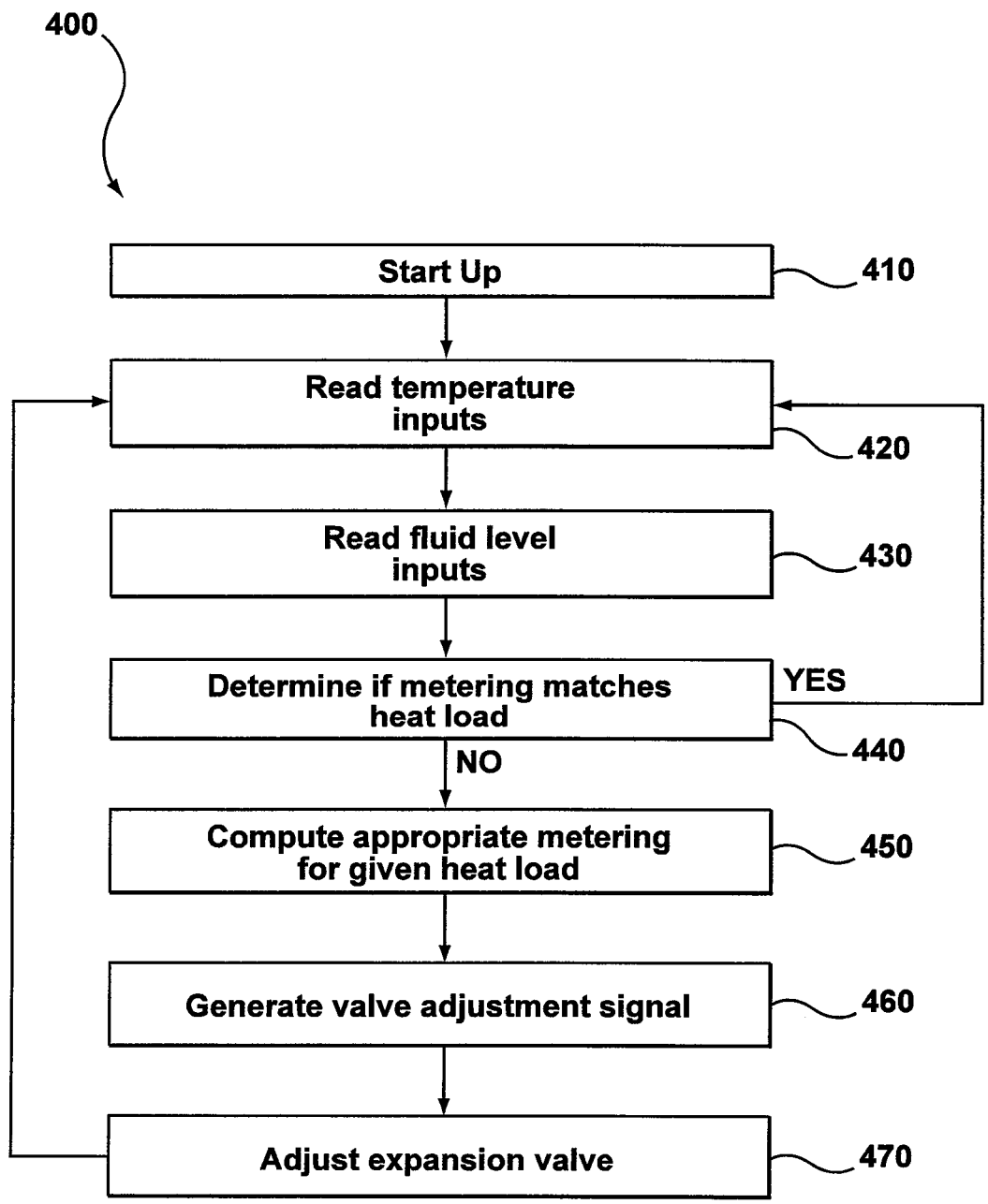
FIG. 4 shows a flow-chart depicting an exemplary method of operating the energy exchange unit of FIG. 3.

The basic operation of one embodiment of energy exchange unit 204 is shown in FIG. 4. Upon start-up of the energy exchange unit 204 (step 400), central control unit 350 activates the system components (e.g. compressor, sensors, etc.), and establishes an initial set-up of the adjustable expansion valve 432 that generally matches the expected load encountered on start-up. At step 410, the central control unit 350 reads inputs from the one or more temperature sensors on energy exchange unit 204. In the embodiment described above, the temperature sensor 336 provides this input. At step 120, central control unit 350 reads inputs from the fluid level sensor 338 provided in the evaporator 324. At step 430, central control unit 350 uses these inputs to determine if the current metering by the expansion valve 332 matches the heat load on energy exchange unit 204. If the metering matches the head load, no adjustments to the expansion valve are necessary. If the metering does not match the heat load, then at step 440, the central control unit 350 computes the appropriate metering for the noted heat load. At step 350, the central control unit 350 generates and sends a valve adjustment signal to the adjustable expansion valve 332. At step 460, the expansion valve adjusts 332 in accordance with the valve adjustment signal, energy exchange unit 204 then returning to step 310 for further monitoring and adjustment as necessary. The central control unit 350 can be programmed to assess the inputs from the various sensors at regular time intervals, for example once every minute, but time intervals less than, or greater than one minute are contemplated.

As will be appreciated, the use of one or more temperature sensors on energy exchange unit 204 need not be restricted to the configuration described above. The configuration described here is merely exemplary, and one can choose to use a different assembly of sensors to provide the central control unit with the necessary information to effect control over energy exchange unit 204.

As briefly mentioned above, the screw-type compressor is quite effective for use in the water chiller system. In some embodiments, the screw-type compressor, in particular a variable frequency screw-type compressor can provide additional benefits and control to the water chiller system.

As heat loads upon energy exchange unit 204 vary, for example through changes in the flow of cold water CW-3 or cold coolant CC-3, then constant compressor capacity may result in a mismatched flow of refrigerant through the evaporator 224, resulting in the aforementioned "flooding" or "starvation" conditions. As such, variable frequency compressors, in particular variable frequency screw-type compressors can be used to vary the amount of refrigerant flowing through the evaporator 324 and into the compressor 320. This form of control is generally known in the art as capacity control.

Control of the variable frequency compressor 320 is provided by the central control unit 350. Based on inputs provided by sensors, for example the aforementioned temperature sensor 336 and fluid level sensor 338, central control unit 350 is configured to determine whether or not the current flow of refrigerant R matches the given heat load. On detecting a mismatched flow of refrigerant, the central control unit 350 instructs one or both of the adjustable expansion valve 332 and variable frequency compressor 320 to adjust to the new condition.

(As will be discussed in greater detail below, controller 208 is also configured to ascertain if such control by control unit 350 is no longer sustaining the energy demands of tank 104 or cooling demands of heat transfer unit 90 or both of them, and at which point to automatically disable energy exchange unit 204 such that system 50 operates as described in relation to FIG. 1 so that cold air CA, as demanded, is still provided to suites 74 and hot water HW, as demanded, is provided to suites 74.)

Figure 5:
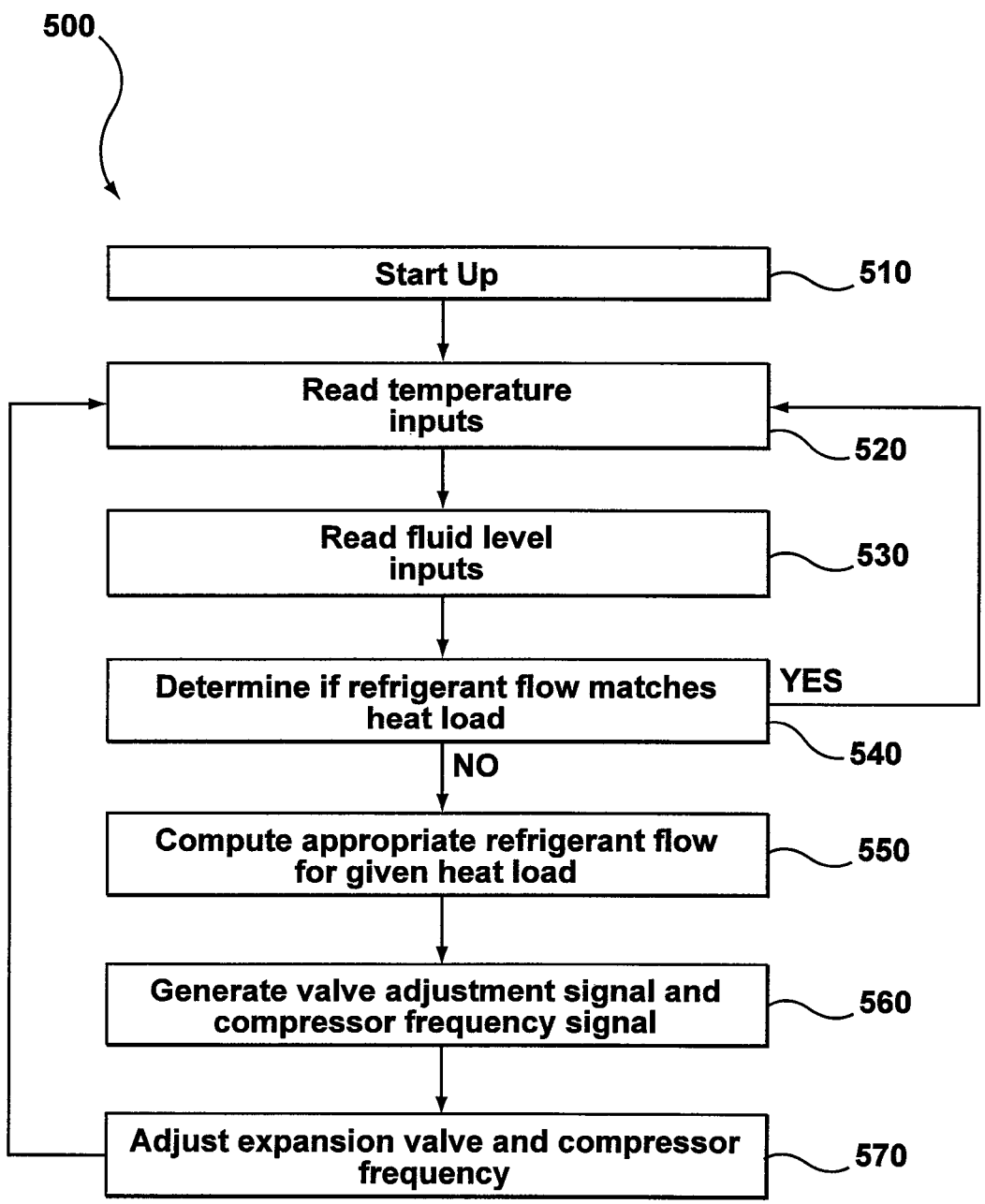
FIG. 5 shows a flow-chart depicting another exemplary method of operating the energy exchange unit of FIG. 3.

The operation of energy exchange unit 204 comprising a variable frequency compressor is shown in FIG. 5. Upon start-up of energy exchange unit 204 (step 500), the central control unit 350 activates the system components (e.g. compressor, sensors, etc.), and establishes an initial set-up of the adjustable expansion valve 332 and variable frequency compressor 320 that generally matches the expected load encountered on start-up. At step 510, the central control unit 350 reads inputs from the one or more temperature sensors 336 on energy exchange unit 204. At step 520, the central control unit reads inputs from the fluid level sensor 338 provided in the evaporator 324. At step 530, central control unit 350 uses these inputs to determine if flow of refrigerant R through matches the heat load on energy exchange unit 204. If the metering matches the head load, no adjustments to the expansion valve 332 and/or variable frequency compressor 320 are made. If refrigerant R flow does not match the heat load, then at step 540, the central control unit 350 computes an appropriate flow of refrigerant R for the noted heat load. At step 550, central control unit 350 generates and sends one or both of a valve adjustment signal and compressor frequency signal to the respective component. The combination of adjustments to the expansion valve and compressor frequency are dependent on a number of factors, including, but not limited to, maintaining the operation of each component with a range of optimal efficiency for the required refrigerant flow. At step 560, the expansion valve 332 and/or compressor 320 adjusts in accordance with the respective signals, the system then returning to step 510 for further monitoring and adjustment as necessary. As previously stated, the central control unit 350 can be programmed to assess the inputs from the various sensors at regular time intervals, for example once every minute, but time intervals less than, or greater than one minute are contemplated.

In some embodiments, the energy exchange unit 204 can further comprise other mechanical/electrical components to enhance the operation and or efficiency of the system. For example, to facilitate the movement of air across the condenser, one or more fan units can be implemented. In some embodiments, while presented above as separate components, the heat reclamation unit 326 and the condenser 322, may be combined into a single unit.

Figure 6:
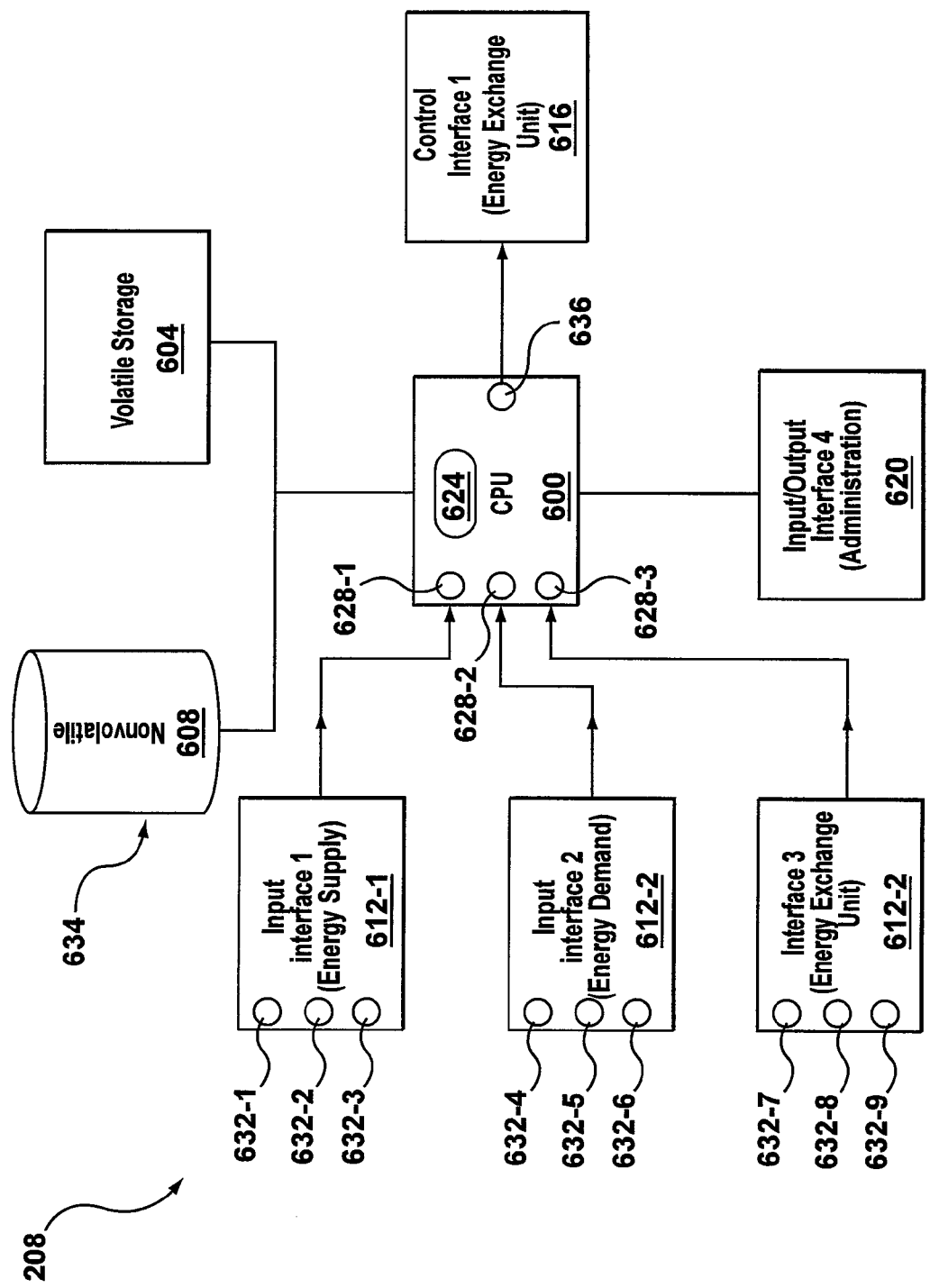
FIG. 6 shows a schematic representation of a controller for system of FIG. 2.

Referring now to FIG. 6, controller 208 is shown in greater detail. Controller 208 comprises at least one central processing unit (CPU) 600 connected to a volatile storage unit 604 (e.g. random access memory) and a non-volatile storage unit 608 (e.g. a hard disc drive) by a bus. Controller 208 also comprises a plurality of input interfaces 612 that connect to CPU 600 and provide input thereto. Controller 208 also comprises at least one control interface 616 that connects to CPU 600 and is controlled thereby. Controller 208 also comprises an administration input/output interface 620 to which a keyboard and monitor can connect, either directly or indirectly through a network such as the Internet, so that controller 208 can be administered.

CPU 600 is configured to execute a plurality of software processes, making appropriate use of volatile storage unit 604 and non-volatile storage unit 608 as needed. FIG. 6 shows certain of those software processes, though it will be appreciated by those skilled in the art that other processes are also running. It should also be understood that the term software process is non-limiting, and can encompass software objects, libraries, classes and generally refers to any code that configures CPU to perform a particular function. Likewise non-volatile storage unit 608 is shown maintaining certain data records that are accessible to CPU 600.

Thus, in FIG. 6, CPU 600 is shown executing an energy exchange unit master control application 624 which receives input data from a plurality of host applications 628, where each host application 628 corresponds to a respective input interface 612. Also in FIG. 6, non-volatile storage unit 608 is shown maintaining an application database 634, which maintains copies of a plurality of host applications 628, including copies of the host applications 628 represented within CPU 600 of FIG. 6. Application database 634 comprises data files that can maintain a data record for a plurality of different types of energy transfer equipment (e.g. hot water heaters, air conditioning units, controllers for the same, etc.). For example, application database 634 can comprises data files for each article of equipment that is listed in Table I and Table II, or data records for additional articles of equipment not shown in Table I and Table II that can be used as energy transfer systems. The data records in application database 634 each correspond to different host applications 628 that are dynamically loadable onto CPU 600 depending on the type of equipment that is connected to input interface 612-1 or 612-2.

Each input interface 612 comprises at least one hardware port 632, with each port conforming to a different format (i.e. form factor corresponding to a particular communication protocol). For example, hardware port 632-1 can be a universal serial bus (USB) format, while hardware port 632-2 can be Ethernet or RJ-45 format. Other formats are contemplated, including terminal posts to receive an analog signal representing a temperature from, for example, temperature sensor TS9. In general, hardware ports 632 correspond to formats that are standard outputs for controller 94 and controller 112, or where a controller does not have a standard output, then hardware ports conform correspond to an output from a temperature sensors TS that supplies that controller 112.

In a specific exemplary embodiment of FIG. 2 through FIG. 6, assume that controller 94 is a commercially available with a standard Ethernet output port, in which case then hardware port 632-1 of input interface 612-1 can be an Ethernet port to receive the output from controller 94. By the same token, assume that while controller 112 is a commercially available Aquastat with an input port to receive data from temperature sensor TS9, while hardware port 632-4 of input interface 612-2 can be identical to the input on the Aquastat so as to receive input from temperature sensor TS-9.

Continuing with these examples, CPU 600 is configured to load an appropriate host application 628 from database 632 according to the specific controller 94 connected to input interface 612-1 and the specific temperature sensor TS-9 that is connected to input interface 612-2. CPU 600 can also be configured to load such a host application 628 automatically (i.e. Plug-and-play) by detecting a particular type of data stream that is available from that hardware port 632, if such a data stream is uniquely identifiable as corresponding to a particular type of controller 94 or temperature sensor TS-9. If the data stream is not uniquely identifiable as corresponding to a particular type of controller 94 or temperature sensor TS-9, then CPU 600 can be configured to receive a manual indication of same via input received via administration input/output interface 620.

In a present embodiment, interface 612-3 is configured to receive an output signal from central control unit 350 that monitors activities of central control unit 350. Likewise a host application 628 executes on CPU 600 corresponding to central control unit 350. Control interface 616 also sends an input signal for central control unit 350 via a driver application 636 (which is also stored in application database 634) that corresponds uniquely to energy exchange unit 204. In this manner, controller 208 is dynamically configurable to work with different types of energy exchange units, other than energy exchange unit 204. Master control application 624 thus sits between host applications 628 and driver application 636 to selectively activate or control or deactivate energy exchange unit 204 according to energy demand and supply within system 50a.

Figure 7:
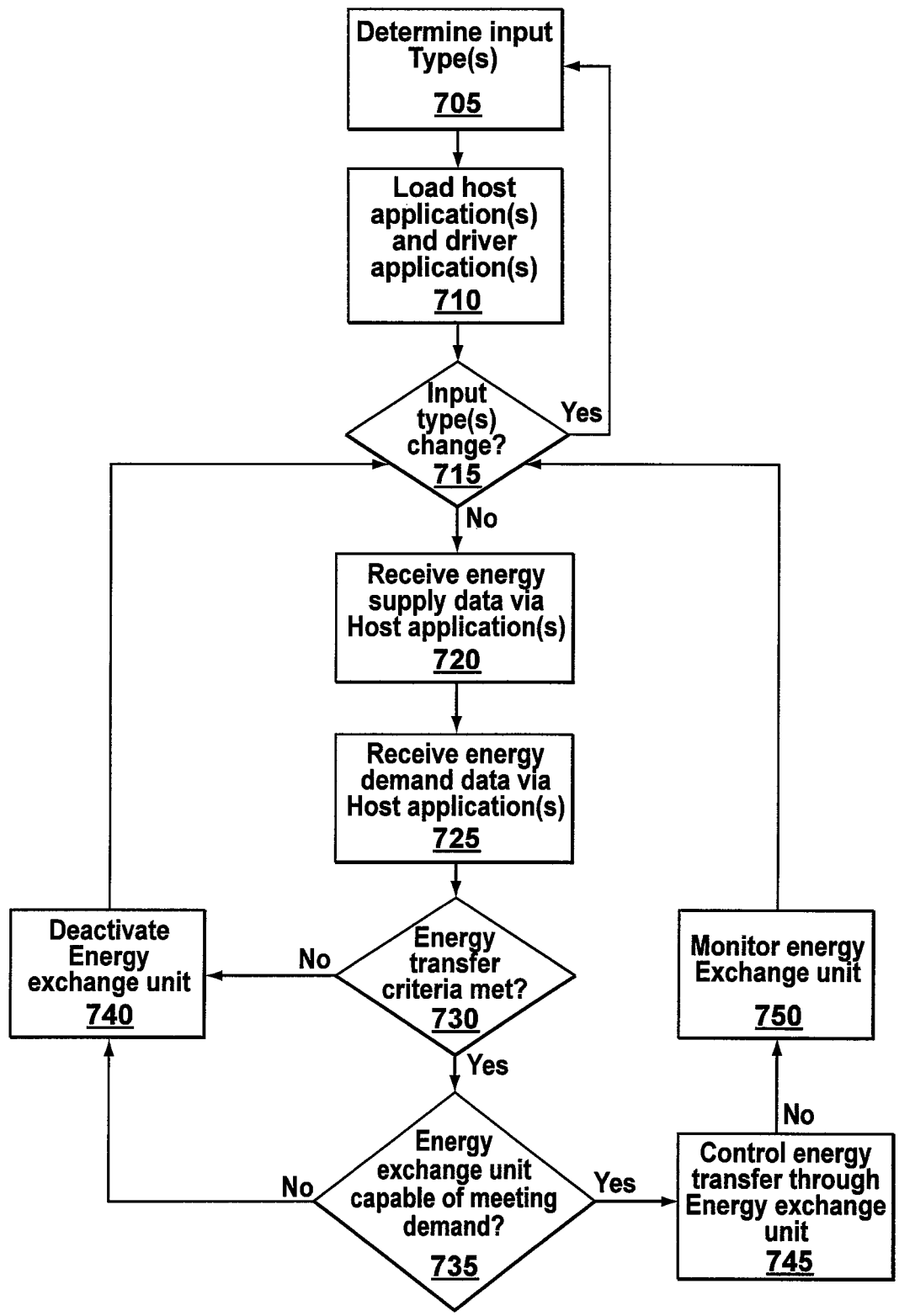
FIG. 7 shows a flow-chart depicting another exemplary method a method for controlling energy transfer.

Referring now to FIG. 7, a method for controlling energy transfer in accordance is depicted in the form of a flow-chart and indicated generally at 700. Method 700 can be used to implement master control application 624. Block 705 comprises determining input types. Block 705 can thus be effected as previously described, whereby master control application 624 examines input signals received via interfaces 612 to determine the type of controller or temperature sensor that is connected interface 612. Where the determination cannot be made automatically, then block 705 can comprise receiving manual input via interface 620 that identifies the type of input being received via particular interface 612.

Block 710 comprises loading applications based on the inputs detected at block 705. As previously described, block 710 thus comprises loading appropriate host applications 628 and driver application 636 from application database 634 to thereby provide software interfaces to the connected controllers or temperature sensors. Such applications 628 and application 636 thus provide master control application 624 with intelligence as to the overall structure and operational parameters of system 50a.

Block 715 comprises determining whether there has been any changes to the input types. In other words, block 715 verifies that changes have been made since the detection at block 705, and if such a change is detected, then method 700 cycles back to block 705. If not change is detected then method 700 advances to block 720.

Block 720 comprises receiving energy supply data via the respective host application(s). In the example above, block 720 comprises examining input received via interface 612-1, which includes data from controller 94. Again, it is to be noted that the monitoring of controller 94 is passive—no changes to controller 94 are required—and that built-in monitoring functions of controller 94 are utilized. The data from controller 94 can thus include information from temperature sensors TS-1 . . . TS-8, or information as to whether or not heat transfer units 86 are activated.

Block 725 comprises receiving energy demand data via the respective host application(s). In the example above, block 725 comprises examining input received via interface 612-2, which includes data from temperature sensor TS-9. Again, it is to be noted that the monitoring of temperature sensor TS-9 is passive—no changes to temperature sensor TS-9 or controller 112 are required. The data from temperature sensor TS-9 can thus indicate whether or not a threshold lower temperature has been reached that would normally cause controller 112 to activate heater 100. Host application 628 can, if desired, be configured with the operational parameters of controller 112 so that master control application 624 can anticipate the operation of controller 112 according to the input from temperature sensor TS-9.

Block 730 comprises determining whether an energy transfer criteria has been met. A "yes" determination would be reached at block 730 where, for example, master control application 624 ascertains that one or more heat transfer units 86 are activated AND where temperature sensor TS-9 has fallen below the threshold lower temperature that causes activation of heater 100. Other ways of reaching a "yes" determination will now occur to those skilled. Conversely a "no" determination would be reached at block 730 where, for example, master control application 624 ascertains that no heat transfer units 86 are activated.

On a "yes" determination from block 730 method 700 advances to block 735, at which point a determination is made as to whether the energy transfer unit 204 is capable of meeting the demand that lead to the "yes" determination at block 730. A "no" determination can be made at block 735 where, for example, a diagnostic exercise reveals that energy transfer unit 204 is in need of a repair or some other fault detection is made. A "no" determination can be made at block 735 where, for example, a diagnostic exercise reveals that even if energy transfer unit 204 is activated, the level of energy required to operate energy transfer unit 204 would not result in any overall net energy savings in system 200*a*. A "no" determination can also be made at block 735 where, for example, a diagnostic exercise reveals that the particular energy demand and supply profiles receive via interfaces 612 will likely lead to the aforementioned "starvation" or "flooding" issues that can occur in the specific, but purely exemplary implementation of energy transfer unit 204 as described above.

Where a "no" determination is made at block 730, or at block 735, then method 700 advances to block 740 and energy exchange unit 204 will be deactivated (or will remain inactive if it is already inactive). Method 700 then cycles back from block 740 to block 715.

Returning again to block 735, a "yes" determination can be made where, for example, the gap between energy supply and energy demand is so great that even where energy transfer unit 204 operates inefficiently, there will still be a net reduction in the amount of energy consumed by heater 100 that more than offsets the energy consumed by energy transfer unit 204. Those skilled in the art will now recognize that less cautious criteria can be used to reach a "yes" determination at block 735.

A "yes" determination at block 735 leads method 700 to block 745. Block 745 comprises controlling the energy transfer unit. In the specific example above, block 745 can include invocation of method 400 or method 500, including the variations thereon, so as to heat water for water tank 104. Other means of controlling the energy transfer unit will now occur to those skilled in the art.

Block 750 comprises monitoring the operation energy transfer unit, to detect faults or any aspects of its operation. While not required, it is generally contemplated that method 700 can comprise heuristic or artificial intelligence algorithms, whereby determinations at block 730 and block 735, and control parameters used at block 745, can change based on historic monitoring at block 750 (including historic data from block 720 and block 725) so that during subsequent cycling of method 700, the activation, or deactivation, or control over energy transfer unit 204 will change so as to provide the most efficient energy savings profile.

Variants on the foregoing are contemplated. For example, in addition to temperature sensors, other environmental sensors can be added, including sensor for barometric pressure, wind speed, rain fall and the like. As another example, further inputs can be provided to controller 208, such as a market-feed of daily energy prices—such as electricity costs for the cooling subsystem or natural gas prices for operating heater 100. Those daily energy price inputs can be further used as part of the determinations made at block 730 or block 735. As another example, valve 212, valve 216, valve 216 and valve 220 can be selectively opened, completely or partially, or closed completely, by remote control from CPU 600 via another control interface (not shown) so as to provide further control over system 50*a*. In this manner, controller 208 can completely remove itself from system 50*a* so that system 50*a* will operate in substantially the same manner as system 50. Various advantages are contemplated by the teachings herein. For example, as has been noted the incorporation of energy transfer units such as energy transfer unit 204 has been virtually non-existent, despite the basic concepts of such technology being known. The present teachings permit the transparent, passive, non-intrusive introduction of such energy transfer technology with minimal risk for the operator of a multi-unit structure, as much of the prior art contemplates replacement of existing infrastructure with an energy transfer unit capable of satisfying all air conditioning and hot water needs. As another advantage, pricing for the capital costs of retrofitting system 200 into an existing system 50 can be based on a cost-savings model, whereby the cost of system 200 is recouped as a function of overall savings—again encouraging adoption of system 200 with minimal or no risk to the operator or owner of a particular multi-unit structure.

As a still further variation, it should be understood that controller 208 can be configured to work with a plurality of different types of energy supply, and energy demand, and energy transfer technologies. Furthermore, controller 208 can be configured to work with a plurality of energy transfer units and also provided additional inputs to work with a plurality of energy supply sources (e.g. air conditioners, furnaces, ovens, chimneys) and a plurality of energy demands (e.g. hot water heaters, hot air supply sources). In this manner controller 208 can dynamically route different excess energy sources to different energy demands.

Further variations, combinations, and subsets of the foregoing are contemplated. The claims attached hereto solely define the scope of monopoly sought.

The invention claimed is:

1. A retrofit energy exchange system for retrofit installation between an existing first energy transfer sub-system and an existing second energy transfer sub-system, the retrofit energy exchange system comprising:
a first set of valves for connecting to a first set of connection points of said existing first energy transfer sub-system; said existing first energy transfer sub-system having an excess supply of energy available at said first set of connection points; said existing first energy transfer system connected a first controller; said first controller configured to receive at least one first input for providing data to said first controller; said first controller configured to send at least one output to said existing first energy transfer sub-system for selectively instructing activation or deactivation of said existing first energy transfer sub-system to thereby generate said excess supply of energy; said first controller having a first passive connection point configured to output a first set data received from said at least one first input;
a second set of valves for connecting to a second set of connection points of said existing second energy transfer sub-system; said existing second energy transfer sub-system having a demand for energy at said second set of connection points; said existing second energy transfer system connected a second controller; said second controller configured to receive at least one second input for providing data to said second controller; said second controller configured to send at least one output to said existing second energy transfer sub-system for selectively instructing activation or deactivation of said existing second energy transfer sub-system to thereby realize said demand for energy; said second controller having a second passive connection point to output a second set of data received from said at least one second input; and
an energy exchange unit connectable to said first set of valves via a first set of conduits; said energy exchange unit connectable to said second set of valves via a second set of conduits; an energy exchange unit controller connectable to said existing first energy transfer sub-system and said existing second energy transfer sub-system to receive said at least one first input and said at least one second input; said energy exchange unit controller configured to activate said energy exchange unit when said energy exchange unit controller determines, based on said at least one first input and said at least one second input, that a present excess supply of energy from said existing first energy transfer system is available to satisfy a present demand for energy at said existing second energy transfer sub-system.

2. The system of claim 1 wherein said existing first energy transfer sub-system is an air conditioning system.

3. The system of claim 1, wherein said existing second energy transfer sub-system is a hot water heating system.

4. The system of claim 1, wherein said energy exchange controller is additionally configured to dynamically adjust determinations for activating or deactivating said energy exchange unit based on different types of input data from different types of equipment.

5. The system of claim 1, wherein said least one first input comprises input from a temperature sensor connected to at least one connection point of said first set of connection points and for receiving a temperature of coolant associated with said existing first energy transfer sub-system.

6. The system of claim 1, wherein said least one second input comprises input from a temperature sensor connected to at least one connection point of said second set of connection points and for receiving a temperature of hot water associated with said existing second energy transfer sub-system.

7. The system of claim 1, wherein said least one second input comprises input from a temperature sensor connected to a tank of a hot water heating system.

8. The system of claim 1, wherein said first set of valves comprises a first valve connected to a coolant line of an air conditioning system and a second valve connected to said coolant line of said air conditioning system.

9. The system of claim 1, wherein the energy exchange unit comprises:
an evaporator for evaporating a refrigerant using energy from said excess supply of energy;
a compressor for compressing the refrigerant;
a heat reclaimation unit for supplying energy to said demand for energy; and
a condenser for condensing the refrigerant.

10. The system of claim 9, wherein the compressor is a screw-type compressor.

11. The system of claim 10, wherein the compressor is a variable frequency compressor.

* * * * *